United States Patent [19]
Frisk et al.

[11] Patent Number: 5,972,448
[45] Date of Patent: Oct. 26, 1999

[54] NANOCOMPOSITE POLYMER CONTAINER

[75] Inventors: Peter Frisk, Chicago; Jacques Laurent, Libertyville, both of Ill.

[73] Assignee: Tetra Laval Holdings & Finance, SA, Pully, Switzerland

[21] Appl. No.: 09/237,396

[22] Filed: Jan. 27, 1999

Related U.S. Application Data

[62] Division of application No. 08/677,282, Jul. 9, 1996, Pat. No. 5,876,812.

[51] Int. Cl.⁶ ............... B29D 22/00; B32B 7/02; B32B 5/16; B32B 7/12
[52] U.S. Cl. ........... 428/35.7; 428/216; 428/331; 428/349; 428/35.1; 428/34.6
[58] Field of Search ................ 428/349, 35.7, 428/34.6, 216, 35.1, 331

[56] References Cited

U.S. PATENT DOCUMENTS

| | | | |
|---|---|---|---|
| 5,102,948 | 4/1992 | Deguchi et al. | 524/789 |
| 5,122,410 | 6/1992 | Lofgren et al. | 428/216 |
| 5,234,763 | 8/1993 | Rosen | 428/349 |

*Primary Examiner*—Jeffrey Stucker
*Assistant Examiner*—Hankyel T. Park
*Attorney, Agent, or Firm*—Welsh & Katz, Ltd.

[57] ABSTRACT

The container of the present invention is composed of a polymer material integrated with a plurality of nanosize particles of a clay mineral which act to enhance the barrier properties of the container. The polymer material may be PET, COPET or any mixture thereof. The nanocomposite polymer container decreases the permeability of various gases without substantially altering the fabrication method for producing containers composed of PET or COPET material, and without altering the containers themselves. The nanocomposite polymer containers of the present invention are able to accomplish this due to the minimal amount of clay integrated with the polymer material, between 0.1% and 10% weight of the container. The small amount of clay provides a substantial barrier due to the high aspect ratios of the clay particles which will vary between 100 and 2000. The nanocomposite polymer container may be produced using in situ polymerization, solution intercalation, or melt exfoliation to integrate the clay mineral with the polymer material matrix. The clay mineral may be smectite, vermiculite, halloysite or any synthetic analog thereof, with a preference for the montmorillonite species of smectite clays.

4 Claims, 6 Drawing Sheets

NANOCOMPOSITE POLYMER CONTAINER

CROSS REFERENCES TO RELATED APPLICATIONS

The present application is a divisional of co-pending U.S. patent application Ser. No. 08/677,282, filed on Jul. 9, 1996.

BACKGROUND OF THE INVENTION

1. Field of the Invention

The present invention relates to a high level gas barrier container composed of a blended polymer material and a method for making containers from the material. Specifically, the present invention relates to a container composed of polyethylene terephthalate, or a copolymer thereof, integrated with nanosize particles of clay in order to decrease the gas permeability, and a method for making the container.

2. Description of the Related Art

Two major considerations of barrier performance relevant to polyethylene terephthalate ("PET") containers are: the ability to retain carbon dioxide within the bottle, specifically for carbonated beverages such as colas and beers; and the ability to minimize oxygen ingress through the container, specifically oxygen sensitive products such as beer and wine. To this end, manufacturers of PET containers have sought various methods to produce PET containers which increase these two attributes.

One method to obtain these attributes in PET containers is to produce multi-layered bottles composed of at least one layer of an ethylene/vinyl alcohol, nylon or poly(ethylene 2,6-naphthalene dicarboxylate) ("PEN") material. An example of such is disclosed in Peece et al, U.S. Pat. No. 5,084,352, for Multilayered Barrier Structures For Packaging. Another method is manufacture a container from a PET/PEN blend material. Still another method is to coat a PET bottle with a polyvinylidene-chloride ("PVDC") film.

The packaging industry has previously produced multi-layered packaging materials consisting of at least one skeletal layer which is composed of a blend of a polymer material and an inorganic filler material. Most of these packaging materials have included the inorganic filler to increase the light-shielding and thermal insulating properties of the package, with a few including the inorganic fillers for their ability to enhance the mechanical properties of the package. In practicing such inventions, the particular size of the inorganic filler particles has not been addressed since these inventions were only seeking to capture the bulk properties of these inorganic fillers for use in their packaging. An example of such is disclosed in Rosen, U.S. Pat. No. 5,234,763, for a Packaging Material And Also Use Of The Material For The Manufacture of Containers. In Rosen, the inorganic fillers are chalk, talc, lime, mica or clay with the preferred filler being chalk.

A recent trend in many fields is to blend polymer materials with particles of a modified clay mineral with very high aspect ratios. An aspect ratio is the ratio of a particular object's width to its thickness. The nanosize particles of clay usually have a width of several microns while the thickness is in the nanometers, hence the designation "nanosize particles." Much of the work in this area has focused on producing a composite material which increases the mechanical strength and heat resistance of the polymer material. One such example is Deguchi et al, U.S. Pat. No. 5,102,948, for a Polyamide Composite Material And Method For Preparing The Same. An object of Deguchi et al is to provide a polyamide composite which possesses the properties of increased mechanical strength and heat resistance, but also has an improved dye-affinity and whitening resistance. The focus of this packaging trend has been to increase the mechanical strength and heat resistance of the polymeric material. This has resulted in the industry attempting to further increase the weight percentage of inorganic matter while maintaining the polymeric nature of the material.

The foregoing patents fail to address the need for developing a container which has a greater impermeability to the ingress and egress of gases without entirely changing the polymeric nature of the material.

BRIEF SUMMARY OF THE INVENTION

A container is provided which may be manufactured from a modified polymeric material which enhances the properties of the polymeric material without substantially altering the material. The enhanced properties include but are not limited to barrier properties, mechanical properties and heat stability. The machinery used to manufacture the containers does not need to be adjusted, and the same contents may be filled in the containers manufactured from modified materials. The present invention is able to accomplish this by providing a novel container composed of PET or a copolymer thereof, integrated with nanosize particles of a clay mineral with aspect ratios of between 100 and 2000.

The container has a decreased permeability for various gases and comprises at least one layer composed of a polymer material integrated with a clay mineral between 0.1% and 10% weight of the container. The polymer material may be selected from the group consisting of PET, a copolymer of polyethylene terephthalate (COPET) or a mixture thereof. The clay mineral may be selected from the group consisting of smectite, vermiculite, halloysite, and any synthetic analog thereof. The smectite clay may be selected from the group consisting of montmorillonite, saponite, beidellite, nontrite, hectorite and mixtures thereof. A preferred clay mineral is montmorillonite clay in a sodium exchanged form. The clay may also be treated with a surfactant before integration with the polymer material. The surfactant is a swelling agent which assists in the integration of the clay mineral with the polymer material. The container may also consists of a multitude of layers, and some or all of these layers may be composed of the polymer material integrated with nanosize particles of a clay mineral between 0.1% and 10% weight of the container. The layer composed of the polymer material integrated with the clay mineral between 0.1% and 10% weight of the container is designed to substantially decrease the ingress of oxygen into the container. The layer composed of a polymer material integrated with the clay mineral between 0.1% and 10% weight of the container is also designed to substantially decrease the egress of carbon dioxide from the container. Additionally, the nanosize particles of clay have a thickness of between 9 Angstroms and 100 nanometers, and an aspect ratio of between 100 and 2000.

The container having a decreased permeability for various gases, composed of at least one layer a polymer material selected from the group consisting of PET, COPET and mixtures thereof, integrated with a clay mineral between 0.1% and 10% weight of the container, may be produced in accordance with a general method. The general method comprises: (1) integrating a clay mineral into a polymer material matrix to form a modified polymer material, the clay mineral being between 0.1% and 10% of the weight of the modified polymer material; and (2) molding the modified polymer material into a container configuration.

Additionally, the clay may be treated with a surfactant before integrating the clay mineral into the polymer material matrix thereby forming a surfactant-clay mineral complex. In a specific method, the integration of the clay mineral into the polymer material matrix is accomplished by intercalating the surfactant-clay mineral complex with the polymer material matrix to form an intercalated polymer material. In this specific example, the intercalated polymer material has a definite x-ray diffraction profile for a gallery spacing.

In an alternative specific example, the integration of the clay mineral into the polymer material matrix is accomplished by exfoliating the clay mineral into the polymer material matrix to form a polymer exfoliated clay material. In this specific example, the polymer exfoliated clay material substantially lacks any x-ray diffraction profile for a gallery spacing. Also, in this specific example, the polymer exfoliated clay material is maintained through dipole interaction of the clay mineral to the polymer. The molding of the modified polymer material into a container configuration may be accomplished through injection stretch blow molding, injection molding, extrusion blow molding or thermoforming.

Another embodiment of the present invention is a modified polymer material for producing a container having a decreased permeability for various gases, the modified polymer material selected from the group consisting of PET, COPET or any mixture thereof, comprising at least one layer composed of the polymer material integrated with a clay mineral between 0.1% and 10% weight of the container. The clay mineral may be selected from the group consisting of smectite, vermiculite, halloysite, and any synthetic analog thereof. The smectite clay may be selected from the group consisting of montmorillonite, saponite, beidellite, nontrite, hectorite and mixtures thereof. A preferred clay mineral is montmorillonite clay in a sodium exchanged form. The clay may also be treated with a surfactant before integration with the polymer material. The surfactant is a swelling agent which assists in the integration of the clay mineral with the polymer material. The container may also consists of a multitude of layers, and some or all of these layers may be composed of the polymer material integrated with nanosize particles of a clay mineral between 0.1% and 10% weight of the container. The layer composed of a polymer material integrated with nanosize particles of a clay mineral between 0.1% and 10% weight of the container is designed to substantially decrease the ingress of oxygen into the container. The layer composed of a polymer material integrated with nanosize particles of a clay mineral between 0.1% and 10% weight of the container is also designed to substantially decrease the egress of carbon dioxide from the container. Additionally, the nanosize particles of clay have a thickness of between 9 Angstroms and 100 nanometers, and an aspect ratio of between 100 and 2000.

Having briefly described this invention, the above and further objects, features and advantages thereof will be recognized by those skilled in the art from the following detailed description of the preferred embodiments of the invention as illustrated in the accompanying drawings.

BRIEF DESCRIPTION OF SEVERAL VIEWS OF THE DRAWINGS

Several features of the present invention are further described in connection with the accompanying drawings in which:

There is illustrated in FIG. 1 a flow diagram of the in situ polymerization process for fabricating a container of the present invention.

Figure 2:
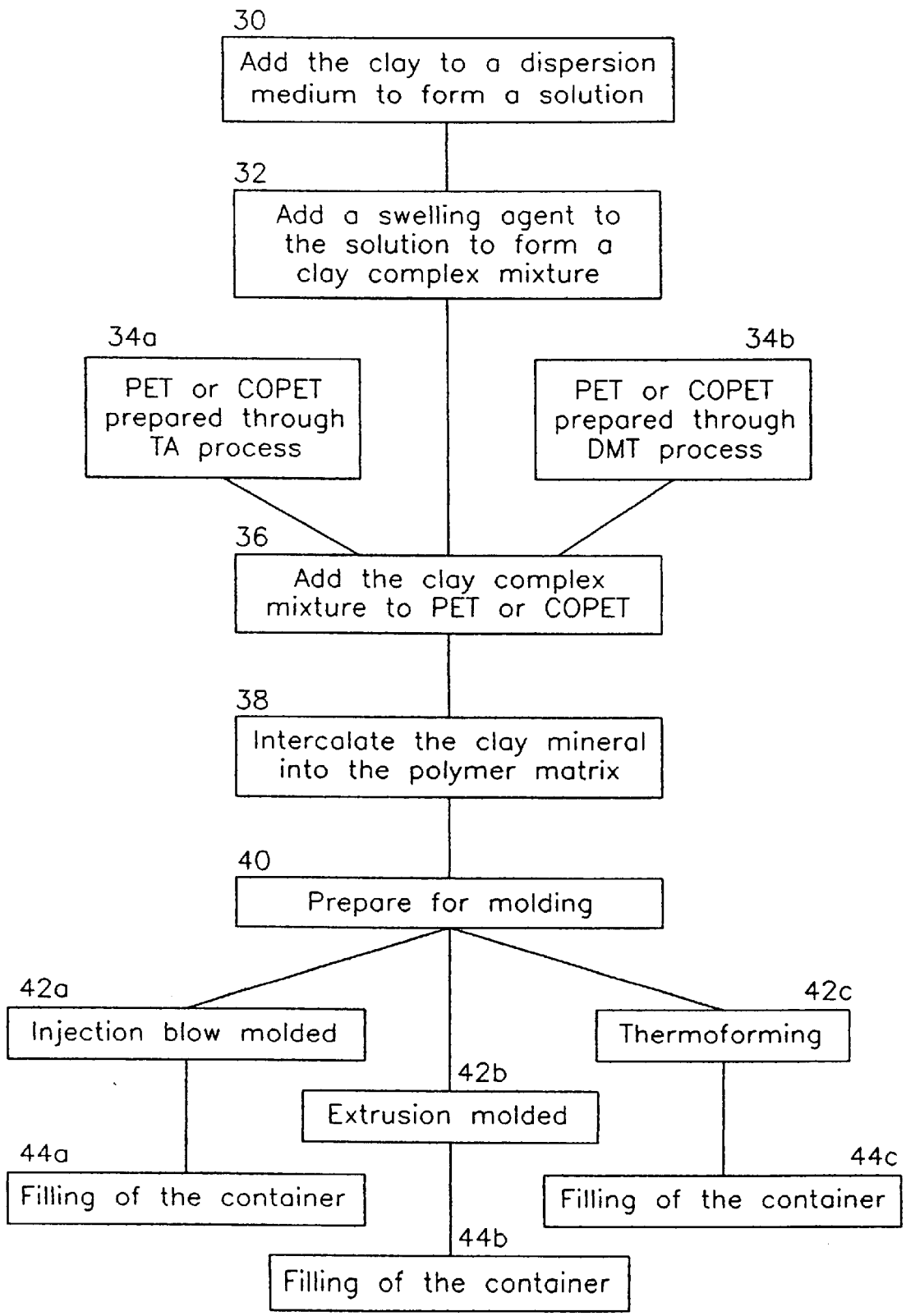

There is illustrated in FIG. 2 a flow diagram of the solution intercalation process for fabricating a container of the present invention.

Figure 3:
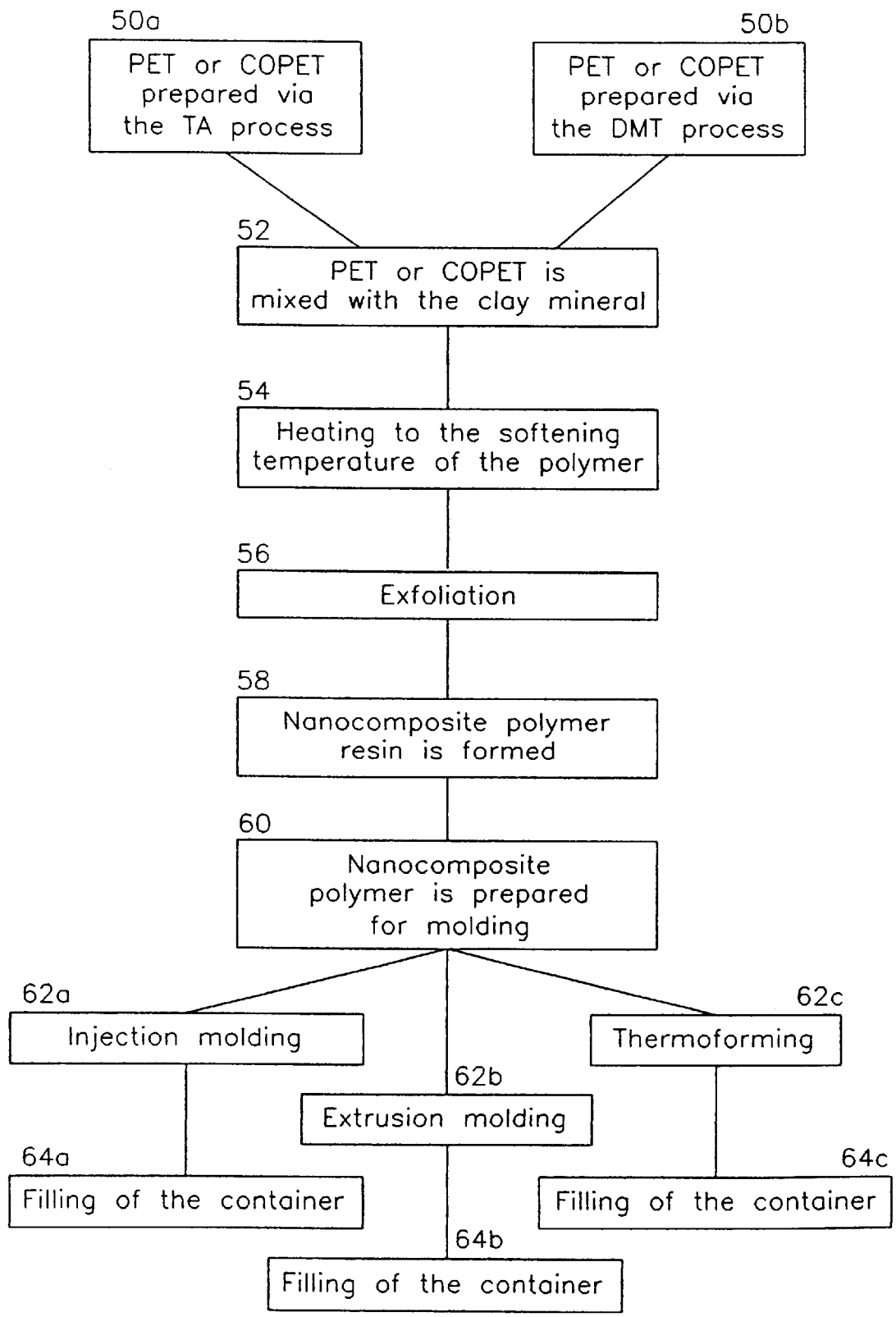

There is illustrated in FIG. 3 a flow diagram of the melt exfoliation process for fabricating a container of the present invention.

Figure 4:
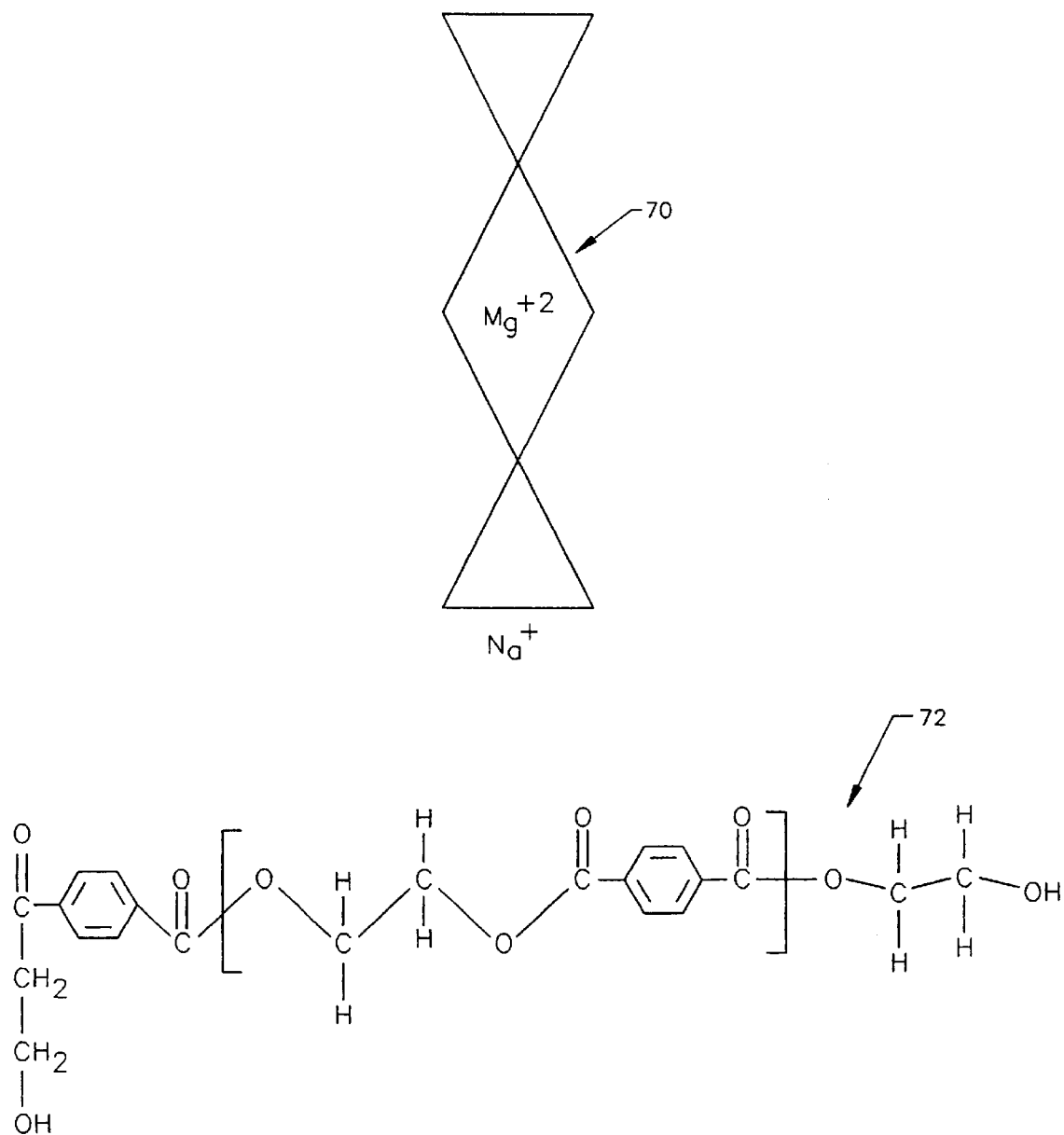

There is illustrated in FIG. 4 a possible melt exfoliation bonding structure between montmorillonite and PET.

Figure 5:
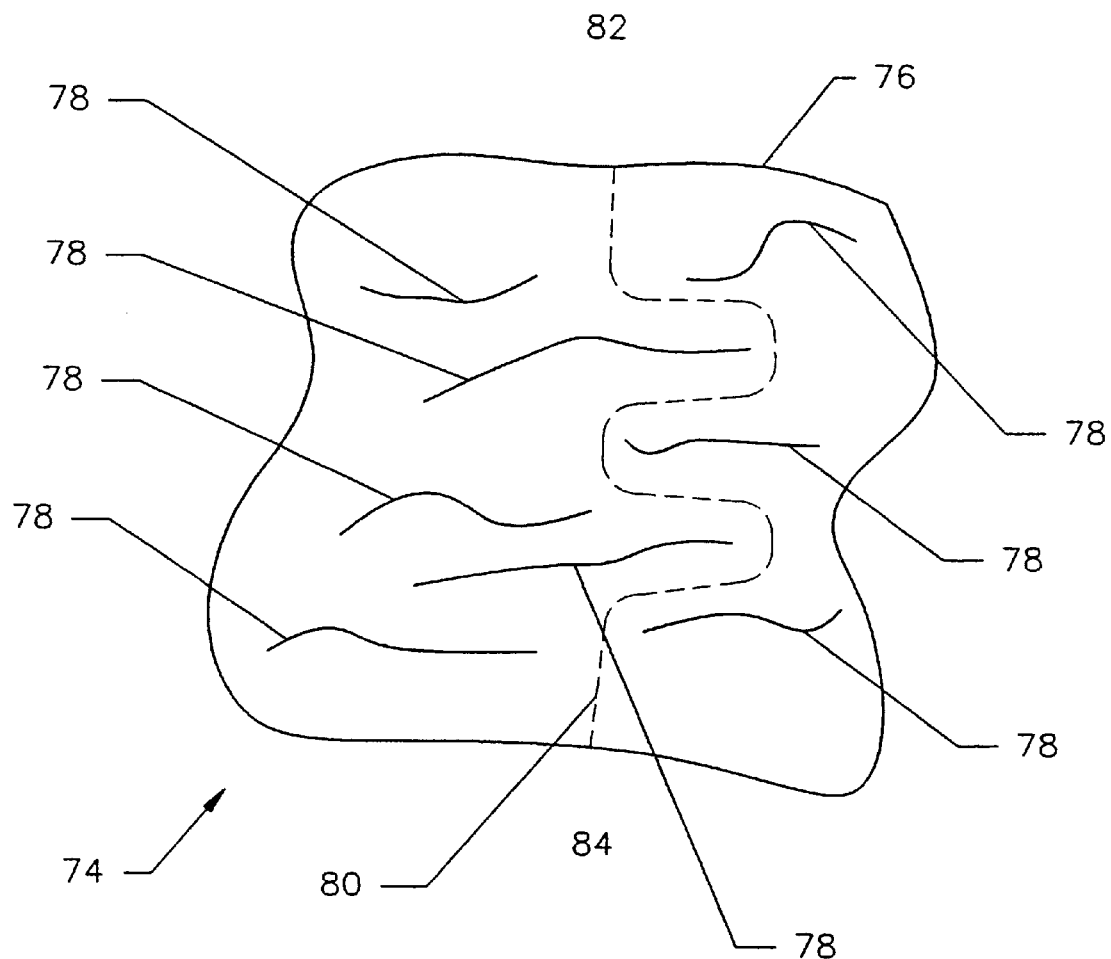

There is illustrated in FIG. 5 a distorted pathway for the ingress and egress of gases through a nanocomposite PET layer of a container of the present invention.

Figure 6:
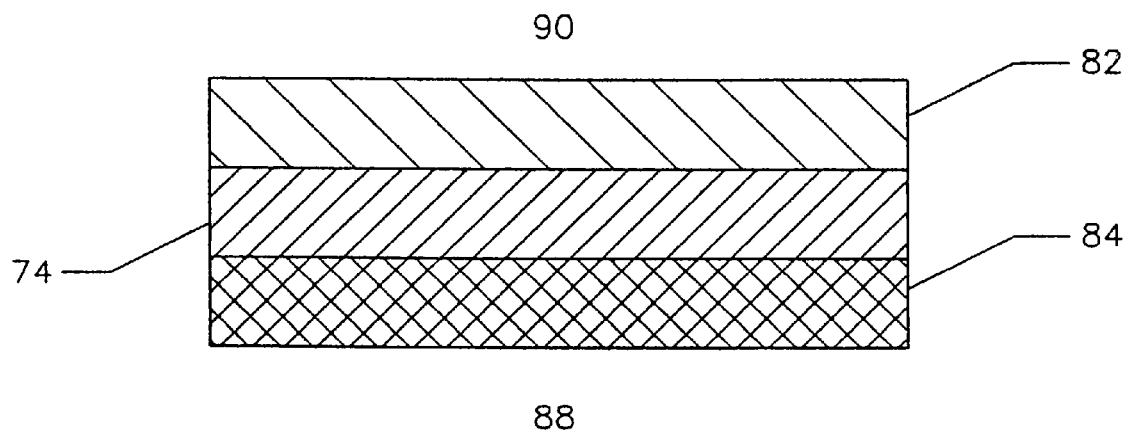

There is illustrated in FIG. 6 a side perspective of multi-layers for a container of the present invention.

DETAILED DESCRIPTION OF THE INVENTION

The present invention is a container composed of a polymer material selected from the group consisting of PET, COPET and any mixture thereof, integrated with nanosize particles of a clay mineral which enhances the containers impermeability to various gases such as oxygen and carbon dioxide. The nanocomposite polymer container of the present invention also increases the heat stability of the container as well as the mechanical properties of the container without affecting the transparency of the container. PET is a linear saturated polyester of high molecular weight which has been used as a container material for many decades because of its good barrier properties and substantial inertness to all foodstuffs. A container material composed of biaxially oriented PET with a PVDC coating may reduce the gas permeation of the container by a factor of 2–3 as compared to a container material composed solely of biaxially oriented PET. A PVDC coating may also double the shelf life of gas sensitive contents such as beverages containing $CO_2$. Although these permeation levels are impressive, the novel container of the present invention drastically reduces the permeation levels of oxygen and carbon dioxide without substantially altering the polymeric nature of PET, COPET or any mixture thereof.

There are many methods to produce specific polymeric materials containing nanosize inorganic particles, nanocomposites, which have been previously disclosed and are known by those skilled in the pertinent art. These methods to produce nanocomposites can be grouped into three general categories: (1) in situ polymerization; (2) solution intercalation; and (3) melt exfoliation. The common inorganic particle for all three methods is a clay mineral selected from the group consisting of smectite, vermiculite, halloysite and any synthetic analog thereof. Of the smectite clays, the most commonly used are montmorillonite, saponite, beidellite, nontrite, hectorite, and mixtures thereof with those skilled in the pertinent art exhibiting the greatest preference for montmorillonite.

An example of in situ polymerization of a nanocomposite is disclosed in Kawasumi et al, U.S. Pat. No. 4,810,734, for a Process For Producing Composite Material. Kawasumi et al discloses a method for the in situ polymerization of a nanocomposite polyamide and a nanocomposite vinyl polymer. "The process of the [Kawasumi et al] invention for producing a composite material comprises a contacting step of contacting a layered clay mineral having a cation exchange capacity of 50 to 200 milliequivalents per 100 g with a swelling agent in the presence of a dispersion medium, thereby forming a complex which has the property of being swollen by a molten monomer and dispersion medium, a mixing step of mixing said complex containing said dispersion medium with a monomer, and a polymerization step of polymerizing said monomer contained in said mixture." Kawasumi et al, U.S. Pat. No. 4,810,734, col. 2, ln.3.

An example of solution intercalation of a nanocomposite is disclosed in the afore-mentioned Deguchi et al patent. "The method for producing the composite material of the [Deguchi et al ] invention is characterized by obtaining a composite in which a layered silicate, with a cation exchange capacity of 50 to 200 millliequivalents/100 g, is in the swelling condition in a dispersion medium, and mixing the composite with a polyamide resin for a residence time of 30 minutes or less, to obtain a composite material in which the layered silicate is uniformly dispersed in the polyamide resin." Deguchi et al, U.S. Pat. No. 5,102,948, col. 4, ln. 40.

Similar to in situ polymerization, a predetermined amount of a clay mineral is dispersed into a dispersion medium and then a swelling agent is added to this mixture. However, unlike in situ polymerization, this mixture is mixed with a polymer resin instead of a monomer of a polymer. The mixing then forms the nanocomposite polymer. A multitude of swelling agents are disclosed in Iwasaki et al, U.S. Pat. No. 5,376,604, for an Organophilic Clay. The present invention is not to be limited to the swelling agents disclosed in Iwasaki et al which are based on a hydroxypolyoxyethylenealky ammonium ion.

Melt exfoliation or melt intercalation is described in Polymer Layered Silicate Nanocomposites, Giannelis, *Adv. Mater.* 1996, 8, No. 1, 29. Unlike in situ polymerization or solution intercalation, melt exfoliation only involves the clay mineral and the polymer without the need for a swelling agent or a dispersion medium. However, a swelling agent may be used to enhance the exfoliation of the clay mineral by particular polymers. In melt exfoliation, the clay mineral and the polymer are mixed together then heated to a temperature above the softening point of the polymer. Melt exfoliation depends on the dipole interactions between the negative charges on the functional groups of the polymer interacting with a cation on the surface of the clay. An example of a clay used in melt exfoliation is montmorillonite which has a single layer of aluminum octahedron in between two layers of silicon tetrahedra. When montmorillonite is in its sodium exchanged form, the dipole moment in the sodium is induced by the isomorphic substitution of magnesium (+2) for aluminum (+3) in the octahedral layer of the clay structure. By attempting to neutralize the charge deficiency, the positively charged sodium may interact with negatively charged functional groups on the polymer such as esters, carbonyls, amides, alcohols, and amines. It has been reported in New High Clarity Gas Barrier Films Using Nano-Composite Technology, Beall, *Flex-Pak* 96, 1996, 125, that this interaction between the clay and the polymer is approximately 26 cal/g. In melt exfoliation, the clay is substantially exfoliated by the polymer thereby forming the nanocomposite polymer. Exfoliation is the complete separation of the individual platelets into the polymer matrix such that no coherent x-ray diffraction occurs.

In the production of a nanocomposite polymer material for further fabrication to a container, wherein the polymer material is either PET, COPET or any mixture thereof, any of the three general methods are available to produce the nanocomposite polymer material. However, these three general methods will be modified to accommodate the specific nature of PET and COPET. For example, in addition to mixing a monomer of PET with the clay and the swelling agent in the dispersion medium using the in situ polymerization method, it may be possible to substitute a PET monomer precursor compound. The following description of the preparation of PET and COPET will demonstrate possible substitution compounds for the monomer.

PET may be prepared from either of two general processes: (1) the dimethyl terephthalate ("DMT") process and (2) the terephthalic acid ("TA") process. The preparation of PET by the DMT process proceeds through two successive ester interchange reactions. In an ester interchange reaction, the alcohol residue of an ester is replaced by another alcohol residue by treating the ester with alcohol. In the first ester interchange reaction, dimethyl terephthalate (a dicarboxylic acid) is heated with an excess of ethylene glycol (a dihydroxy compound) at 150–210° C. in the presence of a catalyst (the molar ratio is 1:2.1–2.2). In the second ester interchange, after the methanol is distilled off, the bis(2-hydroxyethyl) terephthalate serves as both the ester and the alcohol for the reaction. The bis(2-hydroxyethyl) terephthalate is heated at 270–285° C. with continuous evacuation to pressures below 1 mm Hg. Successive interchanges result in the formation of the polyester, PET, which is polymerized until an average molecular weight of about 20,000 is reached and then the molten polymer is extruded from the reactor and disintegrated The preparation of PET by the TA process proceeds through a direct esterification reaction. The terephthalic acid (a dicarboxylic acid) is reacted with ethylene glycol (a dihydroxy) in a molar ratio of 1 to 1.5, at a pressure range of approximately 5 psia to 85 psia, and at a temperature range of approximately 185 to 290° C. for approximately 1 to 5 hours. The products formed are the monomer and water which is removed as the reaction proceeds. Next, the polymerization of the monomer occurs at a pressure range of 0 to 40 mm Hg at a temperature range of about 205 to 305° C. for approximately 1 to 4 hours which results in the formation of the PET resin.

PET and COPET are made by dicarboxylic acid compounds and dihydroxy compounds. As described above, PET is the product of a reaction between terephthalic acid and ethylene glycol. COPET is the product of a reaction of a substitution of either the terephthalic acid or the dimethyl terephthalate (the dicarboxylic acid compound), and ethylene glycol (the dihydroxy compound) which also may be substituted for by another dihydroxy compound. The substitution may be either a partial or a full substitution of either of the compounds. The possible substitutes for the dicarboxylic acid compound include the following: isophthalic acid; adipic acid; sebacic acid; azelaic acid; decanedicarboxylic acid; naphthalenedicarboxylic acid; diphenyldicarboxylic acid; and diphenoxyethanedicarboxylic acid. The possible substitutes for the dihydroxy compound include the following: diethylene glycol; triethylene glycol; trimethylene glycol; tetramethylene glycol; hexamethylene glycol; propylene glycol; neopentyl glycol; 1,3 bis (2 hydroxyethoxy) benzene; 1,4 bis (2 hydroxyethoxy) benzene; bis(2-hydroxyethyl) dimethylmethane; bis(4-beta-hydroxyethoxyphenyl)sulfone; cyclohexanedimethanol; cyclohexanediethanol; and cyclohexanedipropanol. The reactions for producing the COPET is similar to the reactions for forming the PET. The reactions may also be used to produce a blend of PET and COPET. When referring to a mixture of PET and COPET, the mixture may be a blend of PET and COPET, or PET and COPET produced through separate reactions then admixed to form the mixture.

Once the nanocomposite polymer material is formed, the nanocomposite polymer container may be fabricated through a number of molding methods. Although the novel nanocomposite polymer container of the present invention has substantially decreased the permeability of the container to various gases, the novel container may be fabricated in a similar fashion to containers fabricated from umunodified PET or COPET resin with only minor adjustments to the molding processes.

Three possible methods for manufacturing containers from PET or COPET resin are extrusion molding, injection molding and thermoforming. One extrusion method is extrusion blow molding wherein the parison is extruded and blow molded to the final bottle configuration. Another method is extrusion stretch blow molding wherein the parison is extruded and cooled to a wall temperature range of approximately 90–125° C., then blow molded to the final bottle configuration. Still another method is two stage extrusion stretch blow molding wherein the parison is first extruded and cooled to room temperature. Then, the parison is transported to a separate operation where it is reheated to a wall temperature of 90–125° C. and then blow molded to the final bottle configuration.

An injection method is injection blow molding wherein a parison is injected molded and then the hot parison is blow molded to the final container configuration. Yet another injection method is injection stretch blow molding wherein a parison is injection molded and cooled to a wall temperature of 90–125° C. before being stretch blow molded to the final container configuration. A final method is two stage injection stretch blow molding wherein a parison is injection molded and cooled to room temperature. Then, transported to a separate operation where it is reheated to a wall temperature of 90–125° C. and then stretch blow molded to the final container configuration.

Thermoforming is a low pressure process that converts flat, basically two-dimensional thermoplastic sheet stock into larger, generally more complex three dimensional containers. The thermoforming process begins with sheets that are cut to size, then loaded and clamped into a thermoforming machine. The sheet is then heated to a softening temperature and formed into a container. The containers are cooled, unloaded from the machine and trimmed to remove any extra material.

A preferred method of fabricating the nanocomposite polymer container is through two-stage injection stretch blow molding, however any of the previously mentioned molding processes will suffice to fabricate a nanocomposite polymer container embodied by the present invention.

Figure 1:
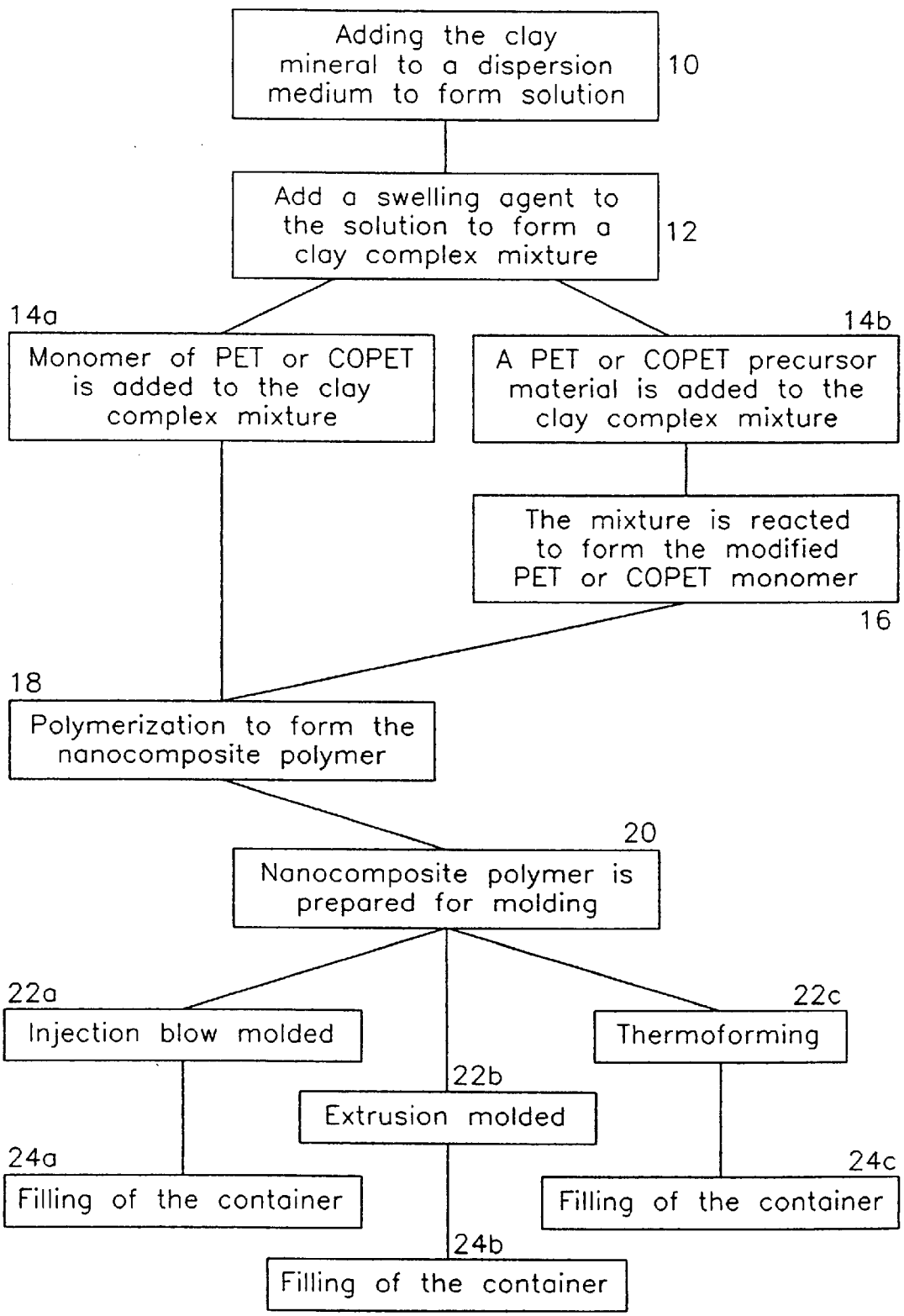

There is illustrated in FIG. 1 a flow diagram of the in situ polymerization process for fabricating a container of the present invention. As shown in FIG. 1, this process of fabricating a nanocomposite polymer container commences at step 10 with adding a clay mineral, selected from the afore-mentioned group, to a dispersion medium to form a clay containing solution. At step 12, a swelling agent is added to the clay containing solution to form a clay complex mixture. The swelling agent, sometimes referred to as a compatibilizer, assists in the exfoliation of the clay with the polymer. At step 14a, a PET or COPET monomer is added to the clay complex mixture. At step 14b, through an alternative pathway, a PET or COPET precursor material, selected from either the TA process or the DMT process, is added to the clay complex mixture. At step 16 along this alternative pathway, the mixture is reacted to form the modified PET or COPET monomer. At step 18, through either pathway, the modified monomer is polymerized to a nanocomposite polymer resin. At step 20, the nanocomposite polymer resin is prepared for molding to the container configuration through the injection molding pathway, the thermoforming pathway, or the extrusion molding pathway. At step 22a, the nanocomposite polymer resin is injection blow molded, through either of the three afore-mentioned injection blow molding processes, to a container configuration. At step 24a, the nanocomposite polymer container is ready to be filled with a desired contents. At step 22b, the nanocomposite polymer resin is extrusion molded, through any of the three afore-mentioned extrusion molding processes, to a container configuration. At step 24b, the nanocomposite polymer container is ready to be filled with a desired contents. At step 22c, the nanocomposite polymer resin is processed through thermoforming to a container configuration. At step 24c, the nanocomposite polymer container is ready to be filled with a desired contents.

There is illustrated in FIG. 2 a flow diagram of the solution intercalation process for fabricating a container of the present invention. As shown in FIG. 2, this process of fabricating a nanocomposite polymer container commences at step 30 with adding a clay mineral, selected from the afore-mentioned group, to a dispersion medium to form a clay containing solution. At step 32, a swelling agent is added to the clay containing solution to form a clay complex mixture. At step 34a, a PET or COPET resin is prepared through the TA process. At step 34b, PET or COPET resin is prepared through the DMT process. At step 36, the clay complex mixture is added to PET or COPET resin, prepared from either the DMT or TA processes. At step 38, the components of step 36 are reacted in order to allow the clay mineral to intercalate into the PET or COPET resin to form a nanocomposite polymer resin. The clay mineral may further integrate itself with the PET or COPET resin to a point where the clay mineral is exfoliated by the polymer. At step 40, the nanocomposite polymer resin is prepared for molding to the container configuration through the injection molding pathway, the thermoforming pathway, or the extrusion molding pathway. At step 42a, the nanocomposite polymer resin is injection blow molded, through either of the three afore-mentioned injection blow molding processes, to a container configuration. At step 44a, the nanocomposite polymer container is ready to be filled with a desired contents. At step 42b, the nanocomposite polymer resin is extrusion molded, through either of the three afore-mentioned extrusion molding processes, to a container configuration. At step 44b, the nanocomposite polymer container is ready to be filled with a desired contents. At step 42c, the nanocomposite polymer resin is processed through thermoforming to a container configuration. At step 44c, the nanocomposite polymer container is ready to be filled with a desired contents.

There is illustrated in FIG. 3 a flow diagram of the melt exfoliation process for fabricating a container of the present invention. As shown in FIG. 3, this process of fabricating a nanocomposite polymer container may commence at either step 50a or step 50b. At step 50a, a PET or COPET resin is prepared via the TA process. At step 50b, a PET or COPET resin is prepared via the DMT process. At step 52, the PET or COPET resin, prepared from either the TA or DMT processes or both, is mixed with a clay mineral, selected from the afore-mentioned group. At step 54, the components of step 52 are heated to the softening temperature of polymer, PET, COPET or any mixture thereof. The clay mineral component of step 52 may be treated with a swelling agent, as previously mentioned for the in situ and solution intercalation methods, to enhance the exfoliation. At step 56, the clay mineral is exfoliated by the polymer. At step 58, a nanocomposite polymer resin is formed. At step 60, the nanocomposite polymer resin is prepared for molding to the container configuration through the injection molding pathway, the thermoforming pathway, or the extrusion molding pathway. At step 62a, the nanocomposite polymer resin is injection blow molded, through either of the three afore-mentioned injection blow molding processes, to a container configuration. At step 64a, the nanocomposite polymer container is ready to be filled with a desired contents. At step 62b, the nanocomposite polymer resin is extrusion molded, through either of the three afore-mentioned extrusion molding processes, to a container configuration. At step 64b, the nanocomposite polymer container is ready to be filled with a desired contents. At step 62c, the nanocomposite polymer resin is processed through thermoforming to a container configuration. At step 64c, the nanocomposite polymer container is ready to be filled with a desired contents.

There is illustrated in FIG. 4 a possible melt exfoliation bonding structure between montmorillonite and the polymer (PET, COPET or any mixture thereof). As shown in FIG. 4, the montmorillonite is generally designated 70 while the polymer is generally designated 72. The montmorillonite 70 has an isomorphic substitution of magnesium for aluminum which creates a charge deficiency which is compensated for by a sodium cation on the surface of the montmorillonite 70. This is the sodium exchanged form of montmorillonite. The sodium cation of the montmorillonite 70 interacts with a negatively charged dipole moment on any of the functional groups of the polymer 72. In FIG. 4, the dipole moment is induced in a carbonyl group of the polymer 72, however those skilled in the pertinent art will recognize that other functional groups may provide the needed negative charge to form the bonding between the montmorillonite 70 and the polymer 72. Although FIG. 4 demonstrates a possible van der Waals-London interaction between the clay 70 and the polymer 72, those skilled in the pertinent art will recognize that other bonding may occur between the clay 70 and the polymer 72 such as covalent or ionic bonding.

There is illustrated in FIG. 5 a distorted pathway for the ingress and egress of gases through a nanocomposite polymer layer of a container of the present invention. As shown in FIG. 5, the nanocomposite layer is generally designated 74 and the polymer matrix is generally designated 76. The plurality of clay platelets interspersed throughout the polymer matrix 76 are generally designated 78. A possible path of ingress or egress of gases through the nanocomposite polymer layer is designated 80. The path 80 travels between the exterior area 82 of the nanocomposite layer and the interior area 84 of the nanocomposite layer. If the container is a single layer container, then exterior area 82 represents the exterior of the container and interior area 84 represents the interior of the container. If the container is a multi-layer container, then exterior area 82 may be another layer of the container or the exterior of the container and interior layer 84 may be another layer of the container or the interior of the container depending on the number of layers of the container.

As is apparent from FIG. 5, any oxygen molecule which would be able to traverse the already substantially impermeable polymer matrix 76, must now circumnavigate the virtually impenetrable plurality of clay layers 78. A similar fate awaits carbon dioxide contained in the container. This distorted pathway 80 demonstrates the remarkable increase in impermeability in gases for the nanocomposite polymer container. What is equally remarkable is the aspect ratios of the plurality of clay platelets 78 which range from 50 to 2000. Although FIG. 5 fails to capture the minimal thickness of the clay platelets 78 relative to their width, the numbers provide a better perception of the astonishing properties of these clay platelets. Those numbers ranging between 9 and 1000 Angstroms for the thickness and between 1 and 5 microns for the width. Thus, the clay platelets 78 have an enormous surface area relative to their mass which accounts for their ability to enhance the properties of polymer containers. The clay platelets 78 may agglomerate to form "tactoids" which increase the thickness of the clay platelets from approximately 9 Angstroms upwards to 1000 Angstroms. As is readily apparent, the aspect ratios of the clay platelets 78 of various thickness may be equal if the corresponding widths vary to maintain a similar surface area for each of the clay platelets 78.

In addition to enhancing the barrier properties of containers, the clay platelets 78 also enhance the heat stability and mechanical properties of the container. An increased heat stability for a container is important in order to allow for "hot-filling" applications. "Hot filling" applications allow for aseptic uses of containers in the food processing industry and also extend the shelf life of various food products. The integrated clay platelets 78 also increase the stiffness of the container while not affecting the transparency of the container which is important in commercial applications. Therefore, even small weight percentages of the clay material relative to the polymer material provide substantial increases in the impermeability of the nanocomposite layer 74, and in the overall properties of the container.

There is illustrated in FIG. 6 a side perspective of multi-layers for a container of the present invention. The container wall is generally designated 86 with the previously described nanocomposite PET layer 74 sandwiched between two layers 82 and 84. Layer 82 was previously designated as exterior area 82 and layer 84 was previously designated interior area 84. An interior of the container is generally designated 88 and an exterior of the container is generally designated 90. Although a three layer container is described in FIG. 6, those skilled in the pertinent art will recognize that the number of layers on either side of the nanocomposite polymer layer may be increased without departing from the scope of the invention. It will also be apparent to those skilled in the pertinent art that layers 82 and 84 may also be nanocomposite polymer layers as well as any number of additional layers.

The present invention will be described in the following examples which will further demonstrate the efficacy of the novel nanocomposite polymer container, however, the scope of the present invention is not to be limited by these examples.

EXAMPLE ONE

Example One demonstrates the barrier properties of an injection stretch blow molded PET bottle. The volume fractions and the aspect ratios of the clay particles are the main parameters in determining the oxygen permeation levels.

The specification of the PET bottle are set forth below.

Neck Size: 43 mm

Filling Volume: 64 oz (1.89 liters)

Bottle Height: 260 mm

Bottle Width: 116 mm

Weight: 81 grams

Average Wall thickness: 0.483 mm

O2 Permeation (as measured by OXTRAN, 23° C., 50% RH):

PET bottles made by Eastman 9663 resin

TABLE ONE

| Clay Volume Fraction (%) | Clay Aspect Ratio | Oxygen permeation (cc/pack 24 hr 0.2 atm O2) |
|---|---|---|
| 0 | N/A | 0.090 |
| 1 | 500 | 0.015 |
| 1 | 1000 | 0.008 |
| 3 | 500 | 0.005 |
| 5 | 1500 | <0.002 |

As is apparent from the values of Table One, an increase in the volume fraction of clay, or an increase in the aspect ratio of the clay particles, leads to a decrease in the permeation of oxygen in the PET bottle. Thus, a minimal amount of nanosize particles of clay greatly enhances the barrier properties of PET bottles. Similar results as those in Table One would be obtained for the permeation of carbon dioxide in bottles having the afore-mentioned composition.

EXAMPLE TWO

Example Two demonstrates the oxygen permeation for containers fabricated from materials with various compositions, or having a multiple of layers.

| Bottle Type | Oxygen Permeation Index |
|---|---|
| Monolayer PET | 100 |
| Multilayer (3–7 layers) PET with coinjected EVOH (max 5%) | 30–60 |
| Multilayer (3–7 layers) PET with coninjected nanocomposite PET (max 5%) | 30–60 |
| Monolayer nanocomposite PET | <30 |

As is apparent from Example Two, the oxygen permeation for a monolayer of nanocomposite PET is remarkably less than that of a monolayer of PET, and even less than multilayer bottles.

From the foregoing it is believed that those skilled in the art will recognize the meritorious advancement of this invention and will readily understand that while the invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A modified polymer material for a transparent container for a flowable food product having a decreased permeability for gases, the modified polymer consisting essentially of a layer of polyethylene terephthalate integrated with a plurality of synthetic smectite particles between 0.1% and 10% weight of the layer of polyethylene terephthalate, each of the plurality of smectite particles having a thickness of between 9 Angstroms and 100 nanometers, and an aspect ratio of between 100 and 2000, the layer of polyethylene terephthalate having a thickness range of approximately 100 microns to approximately 2000 microns.

2. A modified polymer material for producing a container having a decreased permeability for various gases, the modified polymer material comprising:

at least one layer composed of a polymer material integrated with a clay mineral between 0.1% and 10% weight of the container, the polymer material selected from the group consisting of polyethylene terephthalate, a copolymer of polyethylene terephthalate, and a mixture thereof, wherein the clay is a plurality of smectite clay particles each having a thickness of about 9 Angstroms to about 100 nanometers and an aspect ratio of about 100 to about 2000, and wherein the layer of polymer having a thickness of about 100 microns to about 2000 microns.

3. The modified polymer in accordance with claim 1 wherein the smectite clay is montmorillonite clay in sodium exchange form.

4. The modified polymer in accordance with claim 1 wherein the smectite clay has been treated with a surfactant for integration into the polymer material.

* * * * *